(12) United States Patent
Dyer

(10) Patent No.: US 7,447,557 B2
(45) Date of Patent: Nov. 4, 2008

(54) METHOD AND SYSTEM FOR REDUCING PRODUCTION CYCLE TIME OF A HARD DISK DRIVE BY FEATURING AN INVENTORIED GENERIC HARD DISK DRIVE WITH CUSTOMIZED MICROCODE

(75) Inventor: Richard Clinton Dyer, Scotts Valley, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/072,210

(22) Filed: Mar. 4, 2005

(65) Prior Publication Data

US 2006/0200262 A1    Sep. 7, 2006

(51) Int. Cl.
*G06F 19/00* (2006.01)

(52) U.S. Cl. ......................... 700/117; 700/96
(58) Field of Classification Search ................. 700/117, 700/96; 29/603.03
See application file for complete search history.

(56) References Cited

U.S. PATENT DOCUMENTS

| | | | | |
|---|---|---|---|---|
| 4,924,331 A | * | 5/1990 | Robinson et al. ........... 360/72.1 |
| 6,567,235 B2 | * | 5/2003 | Kasetty et al. ........... 360/97.01 |
| 6,651,192 B1 | * | 11/2003 | Viglione et al. ............... 714/47 |
| 6,757,622 B2 | * | 6/2004 | Fioravanti ..................... 702/39 |
| 2002/0040518 A1 | * | 4/2002 | Butts et al. ............... 29/603.09 |
| 2005/0028027 A1 | * | 2/2005 | Kroening et al. ............... 714/6 |
| 2005/0114238 A1 | * | 5/2005 | Sutaria et al. ................. 705/28 |

OTHER PUBLICATIONS http://webopedia.com/TERM/m/microcode.html (Oct. 30, 2001).*
http://kbserver.netgear.com/kb_web_files/N101256.asp (Dec. 14, 2003).*
Beach, M.J., Jones, A.C. "An Integrated Manufacturing Data Management System." IEEE/CHMT '90 IEMT Symposium (1990): 306-311.*

* cited by examiner

*Primary Examiner*—Ryan A. Jarrett
(74) *Attorney, Agent, or Firm*—Merchant & Gould; David W. Lynch

(57) ABSTRACT

A method and system for reducing production cycle time of a hard disk drive and a generic hard disk drive ready for customization. A generic disk drive is provided for stocking until a shipment order is issued. When a shipment order defining customer requirements is received, a generic disk drive from stock is pulled from stock. Then, the generic disk drive is featured to meet the customer requirements.

15 Claims, 6 Drawing Sheets

METHOD AND SYSTEM FOR REDUCING PRODUCTION CYCLE TIME OF A HARD DISK DRIVE BY FEATURING AN INVENTORIED GENERIC HARD DISK DRIVE WITH CUSTOMIZED MICROCODE

BACKGROUND OF THE INVENTION

1. Field of the Invention

This invention relates in general to the production of storage devices, and more particularly to a method and system for reducing production cycle time of a hard disk drive and a generic hard disk drive ready for customization.

2. Description of Related Art

The modern assembly line stems form the method of manufacturing first introduced by Eli Whitney in 1799 based upon the ideas of division of labor and of engineering tolerance, to create assemblies from parts in a repeatable manner. This linear assembly process, or assembly line, allowed relatively unskilled laborers to add simple parts leading to production of an end item. As all the parts were already made, they just had to be assembled. The assembly line also enabled manufacturers to build large quantities of identical products, to increase the rate of production and decrease the per-unit production costs.

An assembly line divides the assembly process into a series of processing steps through which the work-in-process moves until an end product is produced. These steps may be optimized, and once the manufacturing system becomes operational, the manufacturing system will build a number of products with the same configuration using the optimized steps.

Assembly lines are typically used in a built-to-stock production model, where large quantities of identical products are manufactured in anticipation of forecasted demand. The manufactured products are then warehoused until that demand is realized. Built-to-stock manufacturing systems are therefore primarily suited to markets in which manufacturers can accurately predict customer demand.

However, predicting customer demand is risky, at best. For example, in the market for computer systems and related items, technological improvements are realized so frequently and component prices change so rapidly that it is difficult to accurately predict how large the market for any particular product will ultimately be. As a result, when manufacturers in industries like information technology utilize the build-to-stock model, those manufacturers frequently find themselves with stocks of products that are difficult or impossible to market at a profit, i.e., outdated inventory.

Another production model that helps manufacturers avoid the stale-inventory problem is the built-to-order model. According to the built-to-order model, each product is assembled only after a customer has ordered that particular product. One of the disadvantages traditionally associated with the built-to-order model is that more time is required to fill orders, i.e., products must be manufactured, not simply taken from stock. Another disadvantage is that built-to-order manufacturing systems are typically less efficient than built-to-stock manufacturing systems. This drives up the cost of products that are built to order.

Some manufacturers have attempted to minimize the delays associated with the build-to-order model by maintaining a significant inventory of the components required for production, e.g., the components that are assembled to create the finished goods. Maintaining such an inventory, however, imposes costs on the manufacturers, including the costs associated with warehousing the material. Furthermore, in markets where product innovations occur rapidly, such material oftentimes become outdated.

When building an assembly line, various restrictions and sanctions come into play, depending on the product being manufactured and management policy. A hard drive assembly line is no exception. Rather, hard disk drive development is a very competitive business. The useful lifespan of a drive is only about 2 years. Thus manufacturers are unwilling to spend a lot of money on equipment. Moreover, clean rooms are extremely expensive to construct.

During hard disk drive assembly, the main components include a spindle assembly in which a number of disks are stacked at even intervals and fixed to an in-hub type spindle motor, an integrated actuator assembly in which there are a number of magnetic heads and an equal number of voice coil motors (VCMs), a frame, an upper frame cover, bushings which secure the spindle assembly to the frame, and covers for holes opened in the sides of the frame.

Today customers are requesting shorter production cycle times starting from hard disk drive (HDD) order placement to order completion for delivery. However, each manufacturing step for a HDD takes a certain cycle time. In general, HDD manufacturing requires eight steps: 1) parts cleaning; 2) assembly at the clean room; 3) servo track writing on the disk; 4) leak testing; 5) card assembly; 6) function test; 7) stress test and 8) packaging. The cycle time assumes availability of a set of components and capacity to support the above process steps. The component and capacity are planned according to monthly demand forecasts. However, mismatch between the monthly demand forecast and customer orders add three months of more additional cycle time for long lead-time components and to setup capacity.

In addition, manufacturing may have completed HDD inventory that has functions that satisfies another customer. However, the manufacturer cannot ship the HDD because the HDD was assembled using a different specification, e.g., microcode or label. The personalization of the HDD occurs at the assembly at the clean room. This mismatch situation occurs due to differing order activity. Thus, such a HDD becomes idle inventory unless reworked to meet a different specification.

It can be seen then that there is a need for a method and system for reducing production cycle time of a hard disk drive and a generic hard disk drive ready for customization.

SUMMARY OF THE INVENTION

To overcome the limitations in the prior art described above, and to overcome other limitations that will become apparent upon reading and understanding the present specification, the present invention discloses a method and system for reducing production cycle time of a hard disk drive and a generic hard disk drive ready for customization.

The present invention solves the above-described problems by providing a process that involves assembling a generic HDD, storing the generic HDD until a shipment order is received, thereafter pulling the generic HDD from inventory and featuring the HDD to meet the customer needs. The process according to an embodiment of the present invention reduces cycle time by about 75%, e.g., typically from 4 days to 1 day.

A method for reducing production cycle time of a hard disk drive according to an embodiment of the present invention includes assembling a generic disk drive for stocking until a shipment order is issued, receiving a shipment order defining customer requirements, pulling a generic disk drive from stock and featuring the generic disk drive to meet the customer requirements.

In another embodiment of the present invention, a system for reducing production cycle time of a hard disk drive is provided. The system includes inventory of generic disk drives ready for featuring according to customer requirements, an enterprise resource planning system for receiving shipment orders defining customer requirements, a work-in-progress control system, coupled to the enterprise resource planning system, the work-in-progress control system receiving order information from the enterprise resource planning system in response to receiving a shipment order, the work-in-progress control system issuing an assignment of available generic disk drives from inventory for filing the shipment order and issuing work instructions for fulfilling the shipment order and a featuring station for featuring assigned generic disk drives according to the work instructions.

In another embodiment of the present invention, a generic disk drive is provided. The generic disk drive includes a hard disk drive assembly and an electronics system for controlling the hard disk drive assembly, the electronics system including a microcontroller and associated memory, the memory being configured without microcode.

In another embodiment of the present invention, a disk drive production facility is provided. The disk drive production facility includes an inventory of generic hard disk drives, memory having a plurality of microcode sets, each microcode set being configured to meet a different customer's requirements and a featuring station for implementing a microcode set into a hard disk drive assigned from the inventory according to customer requirements specified in a shipment order.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and system for reducing production cycle time of a hard disk drive and a generic hard disk drive ready for customization. A generic HDD is assembled, stored until a shipment order is received, thereafter pulled from inventory and then featured to meet the customer needs. The process according to an embodiment of the present invention reduces cycle time by about 75%, e.g., typically from 4 days to 1 day.

Figure 1:
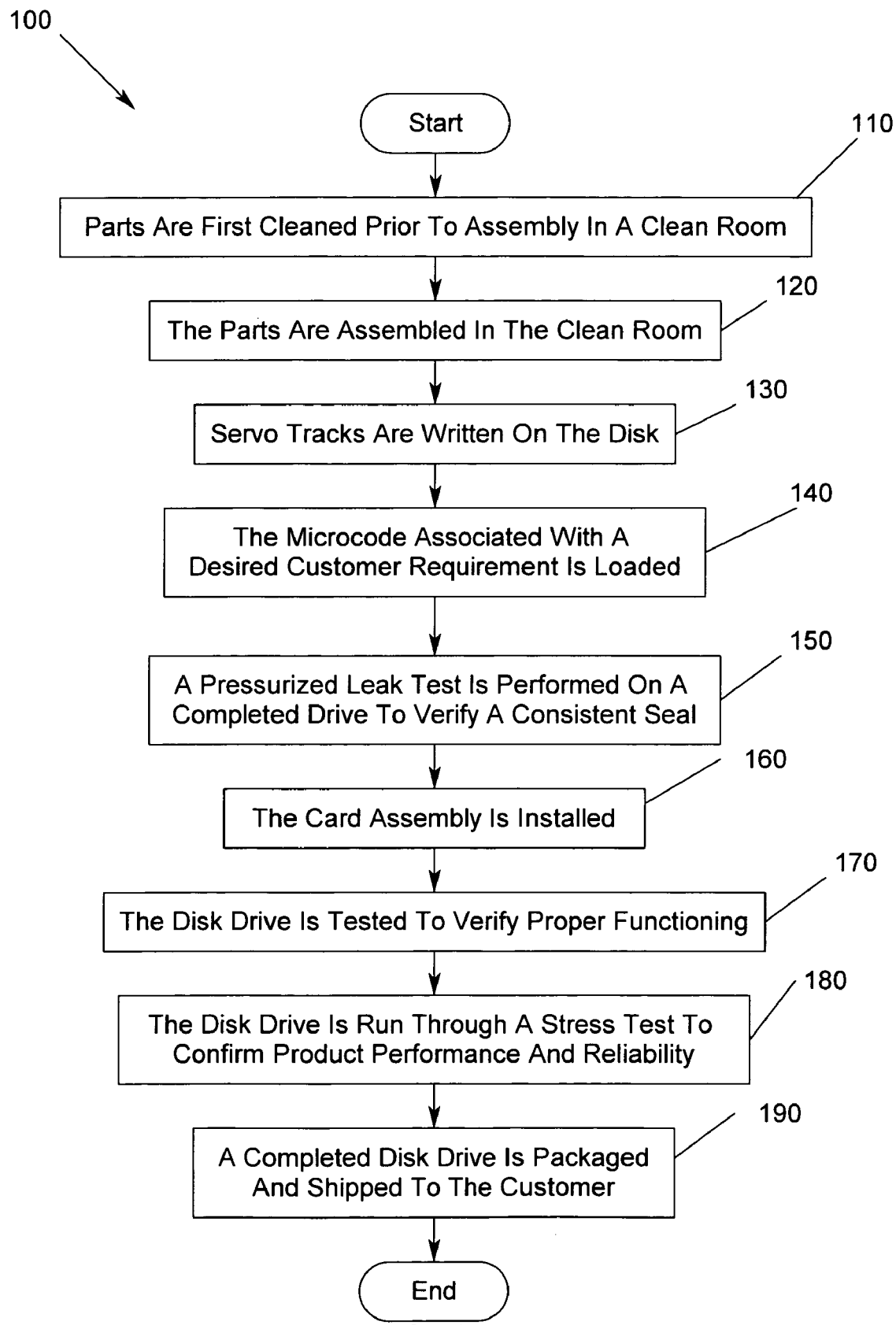
FIG. 1 illustrates a typical method for production of a disk drive.

FIG. 1 illustrates a typical method 100 for production of a disk drive. In FIG. 1, parts are first cleaned prior to assembly in a clean room 110. A clean room or controlled room environment is a work area with controlled temperature and humidity to protect sensitive equipment from contamination. Next, the parts are assembled in the clean room 120. Then, servo tracks are written on the disk 130. The microcode associated with a desired customer requirement is loaded 140. Manufacturers all maintain thousands of lines of propriety microcode for each family of drives. For example, one family of drives may be configured with one of several different versions of microcode to satisfy the various requirements of OEMs. Thus, microcode is used to fine-tune the drive characteristics.

Thereafter, a pressurized leak test is performed on a completed drive to verify a consistent seal 150. At the whole drive level the design engineer must be concerned with drive sealing and particle generation. While the drive is spinning, internal air increases in temperature and pressure. When the disk stops spinning, the drive will breathe in dirty air if it is not completely sealed. Gaskets are designed to provide an airtight seal and slow the penetration of humidity. The baseplate and cover surface that interface with the gasket must be controlled to provide a flat wide surface against which to seal.

After performing the leak test, the card assembly is installed 160. The disk drive is then tested to verify proper functioning 170. Next, the disk drive is run through a stress test to confirm product performance and reliability 180. Finally, a completed disk drive is packaged and shipped to a customer 190.

However, as mentioned above, mismatch between monthly demand forecasts and customer orders add three months of more additional cycle time for long lead time components and to setup capacity. In addition, manufacturing may have completed HDD inventory that has functions that satisfies another customer. However, the manufacturer cannot ship the HDD because the HDD was assembled using a different specification, e.g., microcode or label. The personalization of the HDD occurs at the assembly at the clean room. This mismatch situation occurs due to differing order activity. Thus, such a HDD becomes idle inventory unless reworked to meet a different specification.

Figure 2:
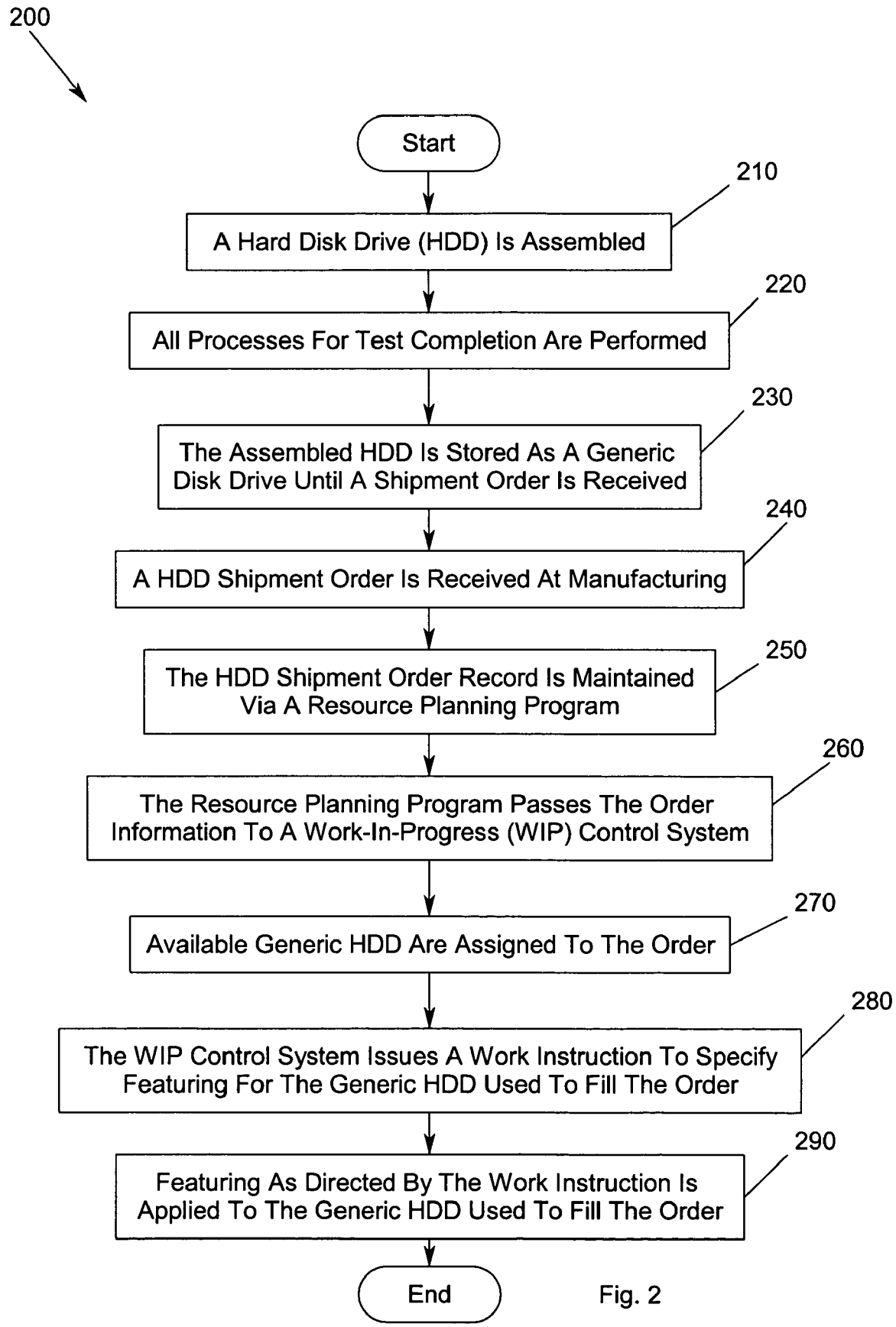
FIG. 2 illustrates a method for reducing production cycle time of a hard disk drive according to an embodiment of the present invention.

FIG. 2 illustrates a method 200 for reducing production cycle time of a hard disk drive according to an embodiment of the present invention. As shown in FIG. 2, a hard disk drive (HDD) is assembled 210. Then, all processes for test completion are performed 220. Thereafter, the assembled HDD is stored as a generic disk drive until a shipment order is received 230. A HDD shipment order is received at manufacturing 240. The HDD shipment order record is maintained via a resource planning program 250, e.g., SAP R/3. The resource planning program passes the order information to a work-in-progress (WIP) control system 260. Available generic HDD are assigned to the order 270. The WIP control system issues a work instruction when the shipment order is filled 280. The work instruction is used to specify featuring for the generic HDD that are used to fill the order. Featuring as directed by the work instruction is applied to the generic HDD used to fill the order 290. Featuring may include downloading the microcode unique to the customer and attaching unique customer labels. The WIP control system also creates all documents required for packaging also. By pulling a generic HDD and then featuring the HDD to meet the customer needs, the cycle time is reduced by about 75%, e.g., typically from 4 days to 1 day.

Figure 3:
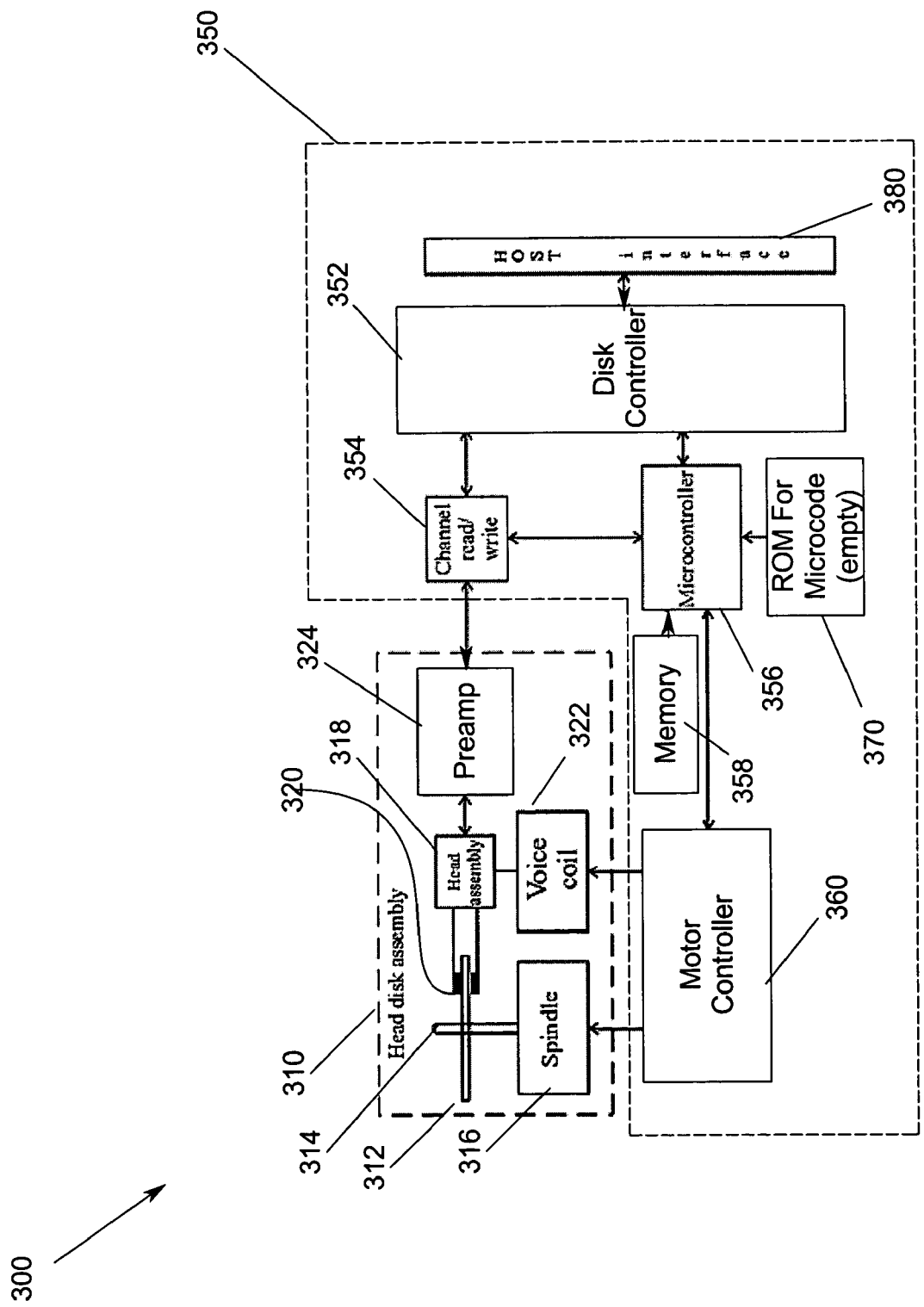
FIG. 3 is a block diagram of a generic HDD according to an embodiment of the present invention.

FIG. 3 is a block diagram of a generic HDD 300 according to an embodiment of the present invention. The generic HDD 300 includes a head-and-disk assembly (HDA) 310 and associated electronics 350. In the HDA, magnetic disks 312 for storing information are mounted on a spindle 314. The spindle 314 is rotated by a spindle motor 316. A head assembly 318 controls movement of the heads 320 relative to the magnetic disks 312. A voice coil motor 322 controls motion of the heads 320 via the head assembly 318. The head disk assembly 310 may also include a preamplifier 324 for writing and reading of information to the magnetic disks 312.

The electronics 350 include a disk controller 352, read/write channel 354 and a microcontroller 356. A memory unit 358, such as a Flash ROM, provides storage capacity of the drive firmware that controls the startup of the generic HDD 300. A motor control module 360 is used to control the spindle motor and voice coil. The read/write channel 354 processes data pulses and encodes data for reading and writing data to the disks. The disk controller 352 determines the speed of data exchange between the generic HDD 300 and a HOST (not shown). The disk controller 352 is programmed at the initialization stage by the microcontroller 356 and sets up the data encoding methods, selects the polynomial method for any error correction, defines sectors, etc.

Drive firmware in memory unit 358 is a collection of programs required for operation of HDD components. The drive firmware in memory unit 358 is used for initial diagnostics, control of spindle motor rotation, data exchange with disk controller, buffer RAM, etc. Microcode 370 associated with a customer configuration code acts as a firmware revision tracking code that defines a specific configuration. The customer configuration code guarantees that the correct revision of drive product is provided to the customer.

The microcontroller 356 executes its program from memory 358 running self-diagnostics, cleaning the working data area in memory and programming disk controller 352 as soon as the power supply (not shown) is switched on. If the microcontroller 356 does not detect any emergency alerts, it starts the spindle motor 316 and waits for the spindle motor 316 to reach its defined rotational speed. Additional instructions may be read and loaded from an area on the disk 312 containing recorded firmware data. Then the microcontroller 356 switches to readiness and awaits commands from HOST via the HOST interface 380. In that mode a command initiates a whole chain of actions performed by all the electronic components 350 in the generic HDD 300.

According to an embodiment of the present invention, the generic HDD 300 is includes a microcontroller 356 and microcode ROM 370 configured without microcode. The generic HDD 300 may later be featured to meet the customer needs. This process reduces production cycle time for manufacturing a hard disk drive. Thus, according to FIG. 3, the microcontroller 356 nor the microcode ROM 370 do not include the microcode for configuring the generic HDD 300. Neither does the generic HDD 300 include labeling that meets customer expectations. Otherwise, the generic HDD 300 is fully operational. The generic HDD 300 is assembled, all tests are satisfied and the generic HDD 300 is inventoried until a shipment order is received.

Figure 4:
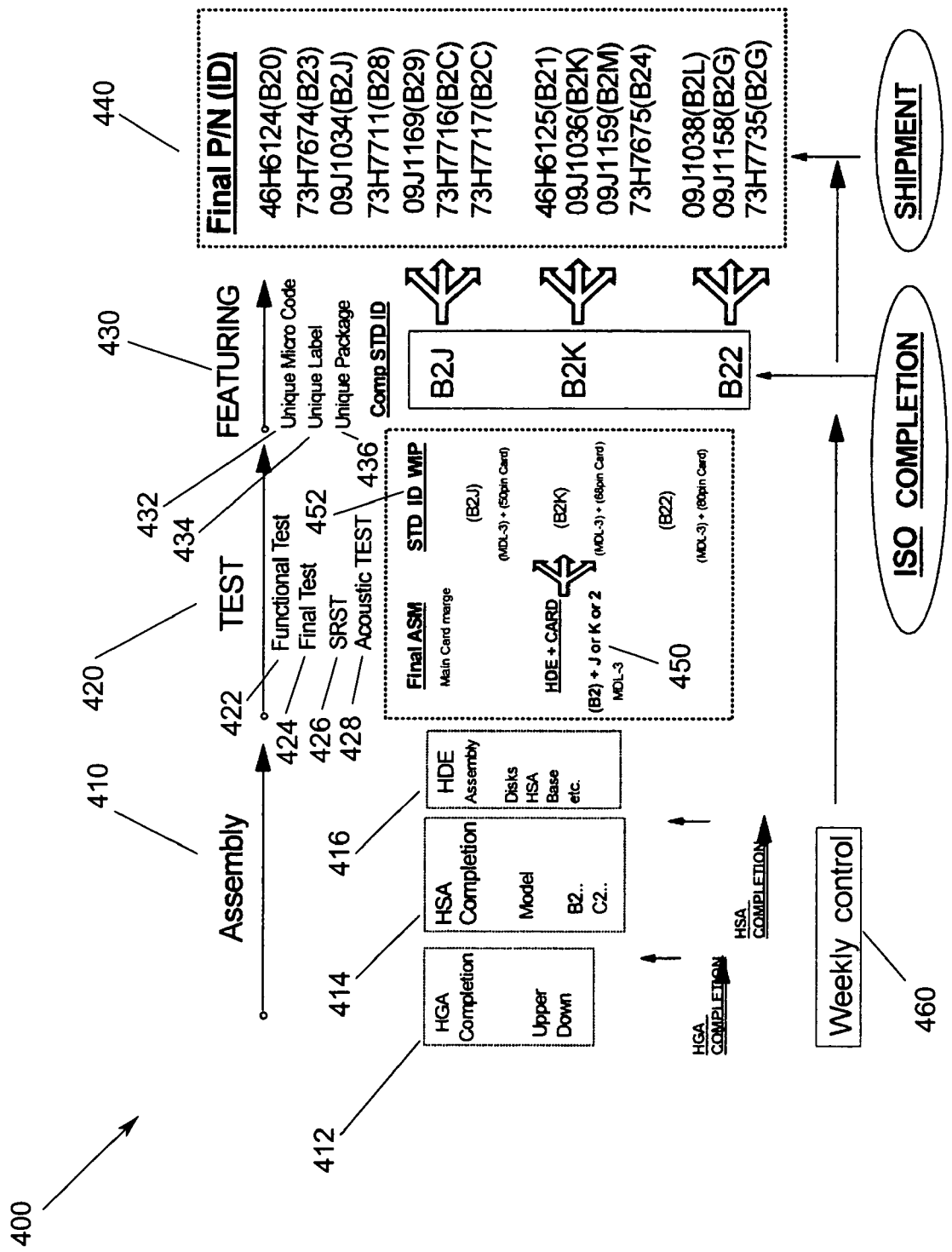
FIG. 4 illustrates a production line flow diagram illustrating the method for reducing production cycle time of a hard disk drive according to an embodiment of the present invention.

FIG. 4 illustrates a production line flow diagram 400 illustrating the method for reducing production cycle time of a hard disk drive according to an embodiment of the present invention. FIG. 4 shows an assembly stage 410, a test stage 420, a featuring stage 430 and the resulting part numbers 440. The assembly stage 410 includes head-gimbal assembly (HGA) completion 412, head-stack assembly (HSA) completion 414 and hard disk enclosure (HDE) assembly 416. The HGA completion 412 includes assembly of a load beam, a gimbal attached to an end of the load beam, and a head attached to the gimbal. The HSA completion 414 includes that includes mounting of a head with at least one transducer for reading and writing data. The HDE assembly 416 includes final hardware assembly including encasing of the disks and an actuator, drive frame, etc.

The test stage 420 includes completion of the functional test 422, the final test 424, the software reset test (SRST) 426 and the acoustic test 428. The code for completing the generic drive is loaded 450, the drives are separated according to work-in-progress identification codes 452 and then placed in inventory until a shipment order is received. The assembly stage 410 and the test stage 420 are part of weekly control 460 and may be easily forecasted.

Upon receipt of a shipment order identifying customer requirements, generic drives are pulled from inventory and processed through the featuring stage 430. The featuring stage 430 includes the loading of the unique customer microcode, customer labeling and packaging. As can be seen in FIG. 4, the drives may then be sorted according to final part number for shipment 440.

Figure 5:
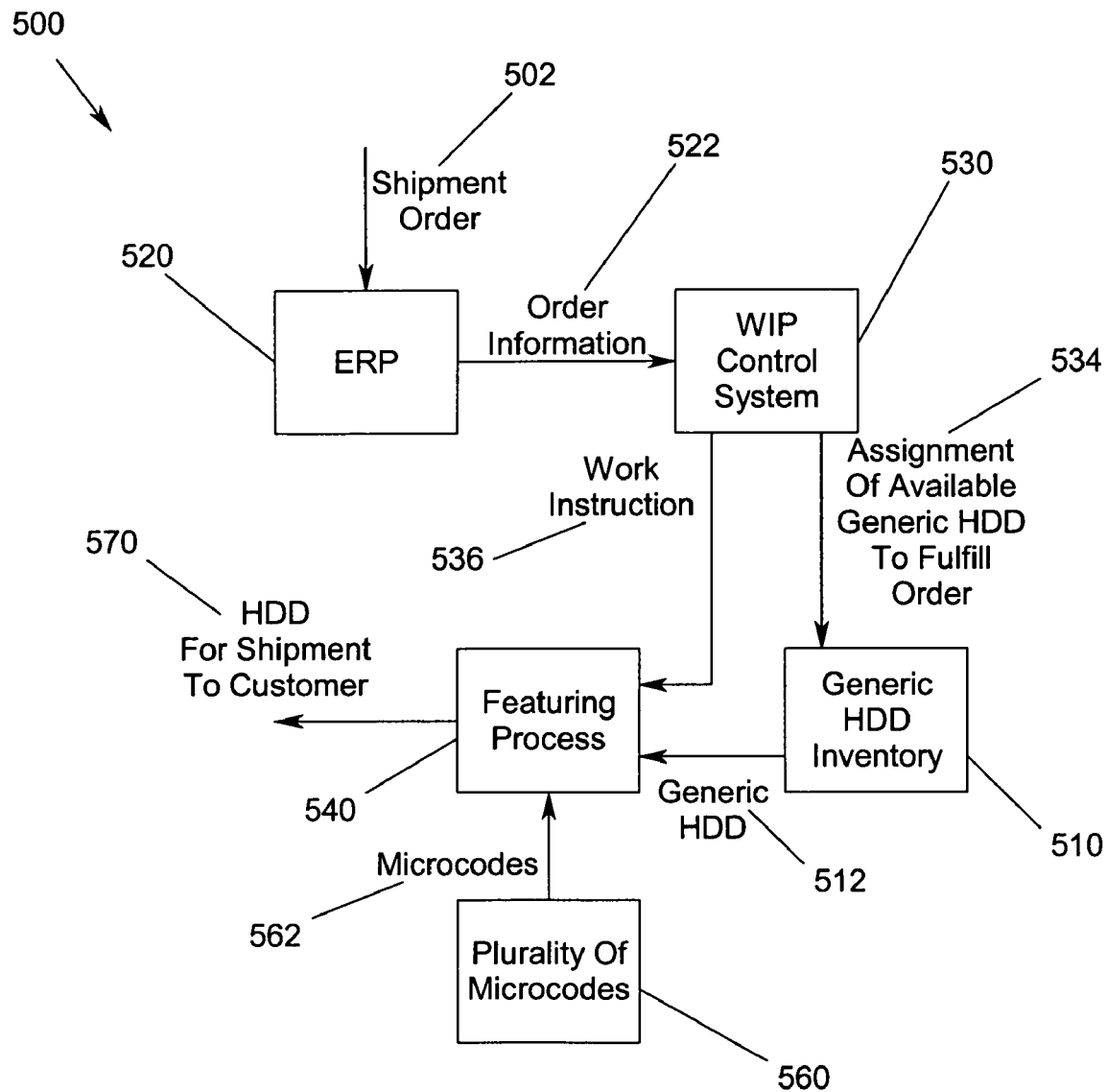
FIG. 5 illustrates a system for reducing production cycle time of a hard disk drive according to an embodiment of the present invention.

FIG. 5 illustrates a system 500 for reducing production cycle time of a hard disk drive according to an embodiment of the present invention. In FIG. 5, an inventory of generic disk drives ready for featuring is provided 510. An enterprise resource planning system 520 receives shipment orders 502 defining customer requirements. A work-in-progress control system 530 receives order information 522 from the enterprise resource planning system 520 in response to receiving a shipment order 502. The work-in-progress control system 530 issues an assignment of available generic disk drives from inventory 534 for filing the shipment order and issues work instructions 536 for fulfilling the shipment order. A featuring station 540 uses the work instructions 536 and generic disk drives 512 to add featuring to the assigned generic disk drives according to the work instructions. The featuring station 540 is coupled to a memory 560 that includes a plurality of microcode sets, wherein each microcode set is configured to meet a different customer's requirements. The featuring station 540, for each generic disk drive 512 used to fill the shipment order 502, downloads microcode 562 unique to the customer and attaches unique customer labels. Thereafter, HDDs customized for the customer 570 are ready for shipment.

Figure 6:
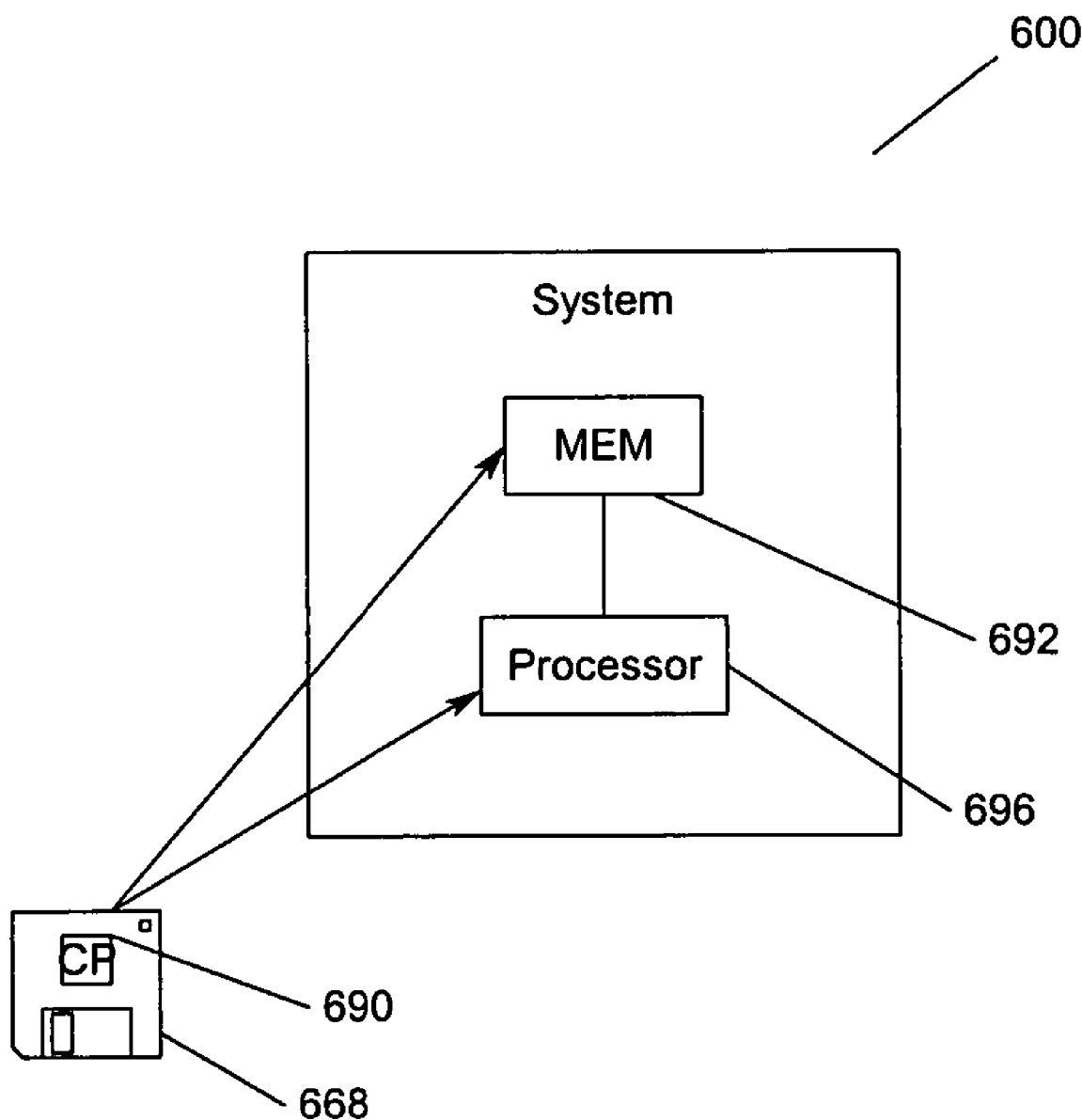
FIG. 6 illustrates a computer-readable medium or carrier embodying a process for reducing production cycle time of a hard disk drive according to an embodiment of the present invention.

FIG. 6 illustrates a production line controller system 600 according to an embodiment of the present invention, wherein the process illustrated with reference to FIGS. 2-5 may be tangibly embodied in a computer-readable medium or carrier, e.g. one or more of the fixed and/or removable data storage devices 668 illustrated in FIG. 6, or other data storage or data communications devices. A computer program 690 expressing the processes embodied on the removable data storage devices 668 may be loaded into the memory 692 or into the production line controller system 600, e.g., in a processor 696, to configure the controller system 600 of FIG. 6, for execution. The computer program 690 comprise instructions which, when read and executed by the production line controller system 600 of FIG. 6, causes the production line controller system 600 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for reducing production cycle time of a hard disk drive, comprising:
   assembling a generic disk drive configured without initial microcode for defining functions of the disk drive;
   after assembling a generic disk drive, holding the generic disk drive in a generic disk drive inventory;
   receiving a shipment order for a disk drive, the shipment order defining requirements of the disk drive desired by a disk drive customer;
   in response to receipt of the shipment order, pulling a generic disk drive from the generic disk drive inventory; and
   featuring the generic disk drive pulled from the generic disk drive inventory by loading initial microcode meeting the disk drive requirements defined by the disk drive customer in the shipment order.

2. The method of claim 1, wherein the assembling a generic disk drive configured without initial microcode for defining functions of the disk drive further comprises:
   assembling the components of a disk drive; and
   performing tests to verify functions and reliability of the generic disk drive.

3. The method of claim 2, wherein the assembling the components of a disk drive further comprises performing servo track writing and card assembly.

4. The method of claim 2, wherein the performing tests to verify functions and reliability of the generic disk drive further comprises performing a leak test, function tests, stress tests and acoustic tests.

5. The method of claim 2, wherein the featuring further comprises providing for the featured disk drive unique packaging materials associated with the customer providing the shipment order.

6. The method of claim 1 further comprising maintaining a record of the shipment order via a resource planning program.

7. The method of claim 6 further comprising passing the order information to a work-in-progress (WIP) control system.

8. The method of claim 7 further comprising assigning a generic disk drive from the generic disk drive inventory to the order and issuing a work instruction for filling the shipment order.

9. The method of claim 8, wherein the issuing a work instruction further comprises identifying initial, unique microcode satisfying disk drive requirements of the customer providing the shipment order used to fill the order according to the work instruction.

10. The method of claim 9, wherein the featuring the generic disk drive to meet the customer requirements further comprises performing featuring as directed by the work instruction.

11. The method of claim 1, wherein the featuring the generic disk drive to meet the customer requirements further comprises downloading to the disk drive microcode unique to the customer and attaching a unique customer label to the disk drive.

12. A system for reducing production cycle time of a hard disk drive, comprising:
   an assembly stage of a disk drive manufacturing line for assembling disk drive configured without initial microcode for defining functions of the disk drives;
   a test stage of a disk drive manufacturing line for receiving the assembled disk drives for testing functional operational of the assembled disk drives;
   a warehouse for receiving and inventorying the tested and assembled disk drives as generic disk drives, the generic disk drives ready for featuring using initial, unique customer microcode satisfying customer requirements;
   an enterprise resource planning system for receiving shipment orders for disk drives, the shipment orders defining disk drive requirements desired by a disk drive customer;
   a work-in-progress control system, coupled to the enterprise resource planning system, the work-in-progress control system receiving shipment order information from the enterprise resource planning system in response to receiving a shipment order from a customer, the work-in-progress control system issuing an assignment of available generic disk drives from inventory in the warehouse for filling the shipment order and issuing work instructions for fulfilling the shipment order; and
   a featuring station for featuring assigned generic disk drives with initial, unique customer microcode meeting disk drive requirements defined in a customer shipment order.

13. The system of claim 12, wherein the featuring station downloads to the disk drives the initial, unique microcode meeting disk drive requirements defined in a customer shipment order of the customer and attaches unique customer labels to each disk drive used to fill the shipment order.

14. A disk drive production facility, comprising:
   an assembly facility for assembling generic disk drives configured without initial microcode for defining functions of the disk drive;
   a test stations for receiving the assembled generic disk drives for performing testing functional operational of the assembled generic disk drives;
   a warehouse having tested and assembled generic disk drives stored therein, the generic disk drives held in a generic disk drive inventory in the warehouse being ready for featuring using initial, unique customer microcode satisfying customer requirements;

memory having a plurality of microcode sets meeting different disk drive requirements of disk drive customers;

an enterprise resource planning system for receiving a shipment order defining disk drive requirements desired by a disk drive customer; and a featuring station for receiving the generic disk drives pulled from the warehouse in response to receipt of shipment orders and for writing to the pulled generic disk drives initial, unique microcode satisfying the customer requirements defined in the received shipment order.

15. The facility of claim 14, wherein the featuring station attaches unique customer labels to each disk drive used to fill the shipment order.

* * * * *